US008572362B2

(12) United States Patent
Castillo

(10) Patent No.: US 8,572,362 B2
(45) Date of Patent: Oct. 29, 2013

(54) PREINSTALLED OPERATING SYSTEM INSTANCES STORED ON REMOVABLE STORAGE DEVICES

(75) Inventor: Ismael N. Castillo, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 399 days.

(21) Appl. No.: 12/725,352

(22) Filed: Mar. 16, 2010

(65) Prior Publication Data
US 2011/0231638 A1 Sep. 22, 2011

(51) Int. Cl.
G06F 9/00 (2006.01)
G06F 9/24 (2006.01)
G06F 12/00 (2006.01)

(52) U.S. Cl.
USPC .................... 713/2; 713/1; 711/115

(58) Field of Classification Search
USPC ......................................... 713/1, 2
See application file for complete search history.

(56) References Cited

U.S. PATENT DOCUMENTS

| 6,574,705 | B1 * | 6/2003 | Peloquin et al. | 711/114 |
|---|---|---|---|---|
| 7,370,164 | B1 | 5/2008 | Nagarkar et al. | |
| 7,496,743 | B1 | 2/2009 | Salazar et al. | |
| 7,539,987 | B1 | 5/2009 | Dey et al. | |
| 7,543,287 | B2 * | 6/2009 | Zimmer et al. | 717/168 |
| 7,624,262 | B2 * | 11/2009 | Diep et al. | 713/2 |
| 2005/0086249 | A1 * | 4/2005 | Keohane et al. | 707/102 |
| 2006/0020940 | A1 | 1/2006 | Culter | |
| 2007/0022427 | A1 | 1/2007 | Arndt | |
| 2008/0148031 | A1 | 6/2008 | Brown et al. | |
| 2008/0189714 | A1 | 8/2008 | Ault et al. | |
| 2008/0244568 | A1 * | 10/2008 | Flemming et al. | 718/1 |
| 2008/0263312 | A1 | 10/2008 | Sater et al. | |
| 2009/0006702 | A1 * | 1/2009 | Sarangdhar et al. | 710/305 |
| 2009/0094447 | A1 * | 4/2009 | Yang et al. | 713/2 |
| 2009/0144538 | A1 | 6/2009 | Duda et al. | |
| 2009/0172384 | A1 | 7/2009 | Anson | |
| 2009/0235265 | A1 | 9/2009 | Dawson et al. | |
| 2009/0240933 | A1 | 9/2009 | Yen et al. | |
| 2011/0173353 | A1 * | 7/2011 | Bauman et al. | 710/28 |
| 2012/0023494 | A1 * | 1/2012 | Harrison et al. | 718/1 |

OTHER PUBLICATIONS

Shimosawa et al.; "Logical Partitioning without Architectural Supports", 32nd Annual IEEE Inter. Conf. on, Jul. 28-Aug. 1, 2008, pp. 355-364.
Amila et al.; "QURIXX—A Portable Operating System Which Could be Shifted Across Any Heterogeneous Computer", Inter. Conf. Colombo, Sri Lanka, Dec. 15-18, 2005.
Ueno et al.; "Virtage: Hitachi's Virtualization Technology", Grid and Pervasive Computing Conference, May 4-8, 2009, pp. 121-127.
Parikh et al.; "POWERAIX/LINUX User Group", IBM System p, IBM Corporation 2004.

* cited by examiner

Primary Examiner — Suresh Suryawanshi
(74) Attorney, Agent, or Firm — Steven Bennett

(57) ABSTRACT

One or more removable storage devices inserted into a computing device store a number of different preinstalled operating system instances. The computing device has a number of logical partitions. Each logical partition is independently executed on the computing device. Each logical partition is mapped to and uses one of the different preinstalled operating system instances. As such, a given preinstalled operating system instance to which a given logical partition is mapped is used by the given logical partition without ever having to be installed on the given logical partition.

18 Claims, 4 Drawing Sheets

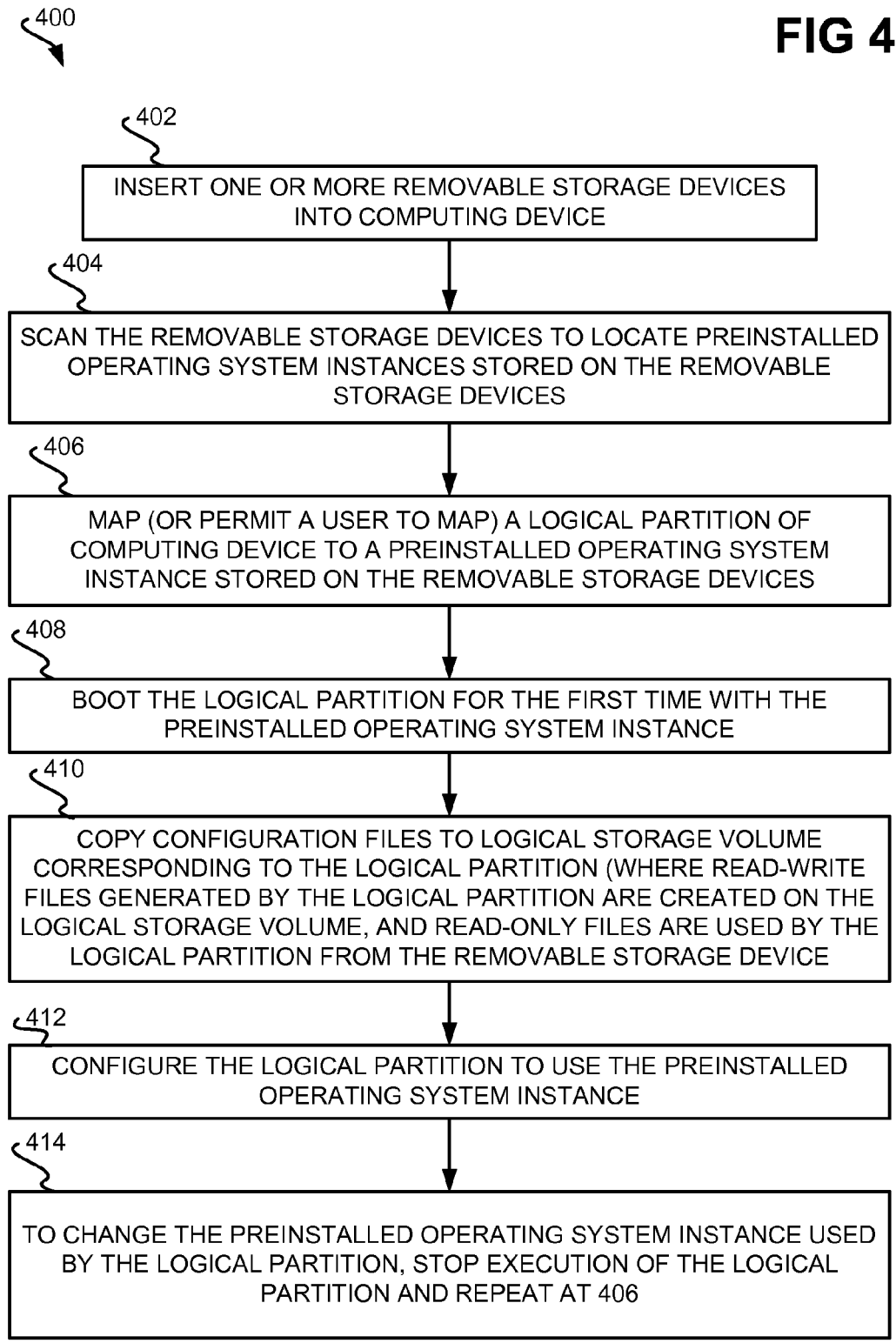

PREINSTALLED OPERATING SYSTEM INSTANCES STORED ON REMOVABLE STORAGE DEVICES

FIELD OF THE INVENTION

The present invention relates generally to a computing device that has logical partitions, and more particularly to these logical partitions using preinstalled operating system instances stored on removable storage devices. As such, a given preinstalled operating system instance is used by a given logical partition without ever having to be installed on the given logical partition.

BACKGROUND

A computing device can have a number of logical partitions. Each logical partition is independently executed on the computing device, and can use a different operating system instance. Traditionally, for a given operating system instance to be used by a given logical partition of a computing device, the given operating system instance is installed on the given logical partition, and this process is repeated for each logical partition of the computing device. An operating system instance may be a particular operating system, a particular version of a particular operating system, or a particular technology level or service pack of a particular version of a particular operating system.

BRIEF SUMMARY

A computing device of an embodiment of the invention includes one or more removable storage devices to store different preinstalled operating system instances. The computing device includes hardware to support logical partitions. Each logical partition is independently executed on the computing device, and is mapped to and uses one of the different preinstalled operating system instances. A given preinstalled operating system instance to which a given logical partition is mapped is thus used by the given logical partition without ever having to be installed on the given logical partition.

A method of an embodiment of the invention includes inserting one or more removable storage devices into a computing device. The removable storage devices store different preinstalled operating system instances. The computing device has logical partitions. Each logical partition is independently executed on the computing device. The method further includes mapping each logical partition to one of the different preinstalled operating system instances. A given preinstalled operating system instance to which a given logical partition is mapped is thus used by the given logical partition without ever having to be installed on the given logical partition.

A computer program product of an embodiment of the invention includes a computer-readable data storage medium storing one or more computer programs that when executed by a computing device cause a method to be performed. The method includes scanning one or more removable storage devices inserted into the computing device to locate different preinstalled operating system instances stored on the removable storage device. The computing device has logical partitions. Each logical partition is independently executed on the computing device. The method further includes permitting a user to map each logical partition to one of the different preinstalled operating system instances. A given preinstalled operating system instance to which a given logical partition is mapped is thus used by the given logical partition without ever having to be installed on the given logical partition.

In one embodiment, configuration files pertaining to a preinstalled operating system instance being used by a logical partition are stored on a logical storage volume of the logical partition. The configuration files are not stored on the removable storage device on which the preinstalled operating system instance itself is stored. Rather, the removable storage device stores read-only files of the preinstalled operating system instance. The logical storage volume also stores read-write files used by the operating system instance when running on the logical partition.

BRIEF DESCRIPTION OF THE SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

FIG. 4 is a flowchart of a method, according to an embodiment of the present invention.

DETAILED DESCRIPTION

Figure 1:
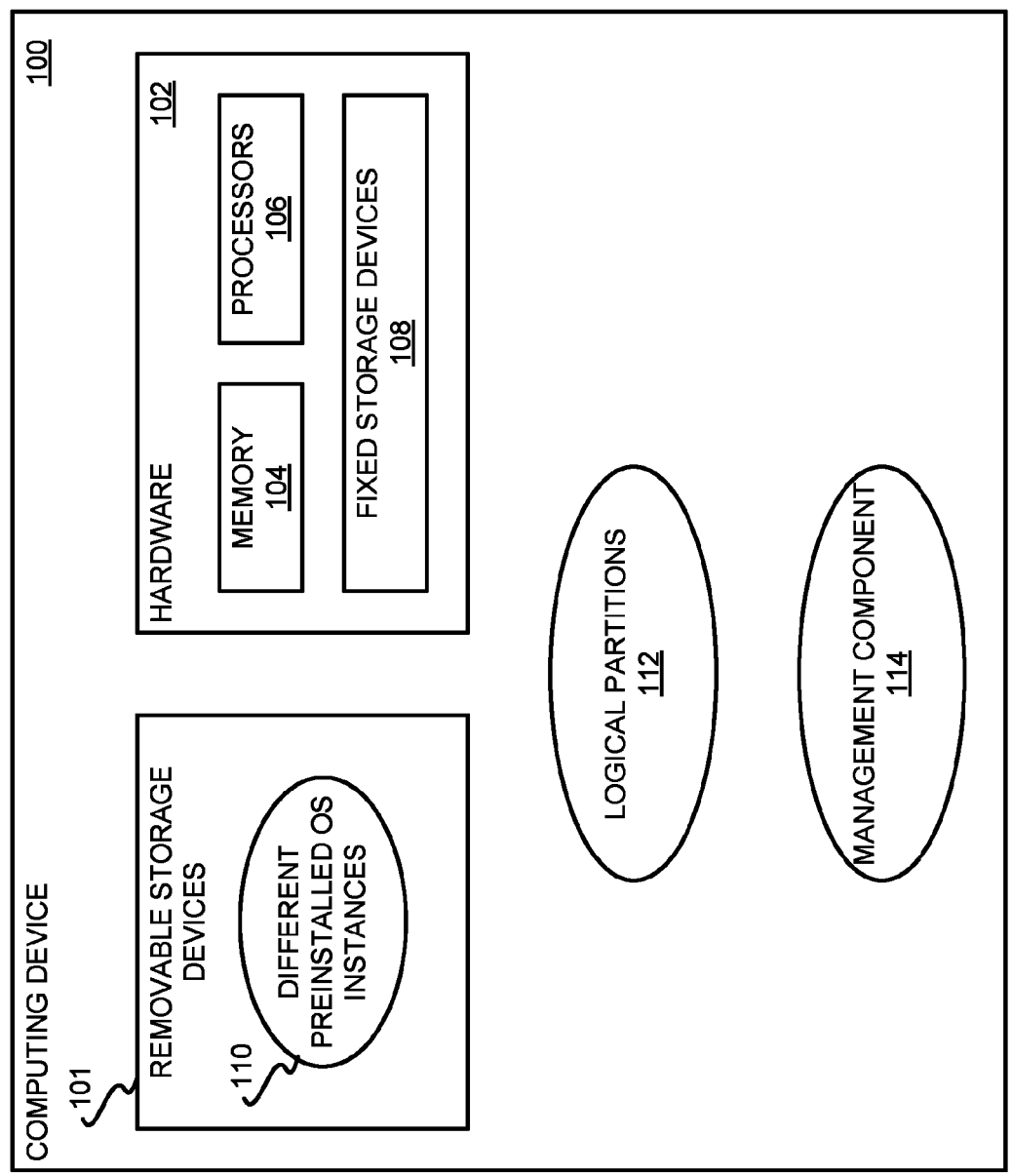
FIG. 1 is a diagram of a computing device having logical partitions that use preinstalled operating system instances stored on removable storage devices, according to an embodiment of the present invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, traditionally for an operating system instance to be used by a logical partition of a computing device, the operating system instance is installed on the given logical partition. However, this process is laborious. The process has to be repeated for each logical partition of each computing device. Furthermore, once an operating system instance has been installed on a logical partition, the logical partition cannot be easily "rolled back" to use a prior operating system instance previously used by the logical partition. Rather, the prior operating system instance typically has to be reinstalled on the logical partition.

By comparison, in embodiments of the invention, different preinstalled operating system instances are stored on removable storage devices of a computing device. For a logical partition of the computing device to use a desired operating system instance, the logical partition simply has to be mapped to the desired operating system instance and rebooted to use this new operating system instance. All aspects concerning the logical partition remain in the logical partition's local storage volume. An operating system instance does not ever have to be actually installed on a logical partition.

It may be desired to update a logical partition to a new operating system instance. The new operating system instance may be a new version of the same operating system that the logical partition is currently using, a new technology level or service pack of the same version of the same operating system that the logical partition is currently using, or a different operating system than that which the logical partition is currently using. A new removable storage device storing the new operating system instance, preinstalled, may be inserted into the computing device, or a new update to a current operating system instance can be added to an existing storage device. In either case, the logical partition is mapped to the new preinstalled operating system instance and rebooted, so that the logical partition now uses the new preinstalled operating system instance without it ever having to be installed on the logical partition.

It may alternatively be desired to rollback a logical partition to a prior operating system instance previously used by the logical partition. For example, the current operating system instance may be a newer version of the same operating system of the prior operating system instance, but has been determined to cause problems, necessitating a rollback. The logical partition is simply mapped to the prior preinstalled operating system instance and rebooted. The logical partition thereafter again uses the prior operating system instance, without the prior operating system instance having to be installed on the logical partition.

FIG. 1 shows a computing device 100, according to an embodiment of the invention. The computing device 100 includes one or more removable storage devices 101, as well as other hardware 102, such as memory 104, processors 106, and fixed storage devices 108, among other types of hardware. The removable storage devices 101 may be flash memory cards, such as Universal Serial Bus (USB) thumb drives, or other types of removable storage devices 101 that can be easily inserted into and removed from the computing device 100 without having to use, for instance, of screwdrivers, and without having to remove the cover of the computing device 100. By comparison, the fixed storage devices 108 are typically hard disk drives that are mounted in the interior of the computing device 100, such that the cover of the computing device 100 usually has to be removed, and a tool like a screwdriver typically used, to remove the devices 108.

The removable storage devices 101 store a number of different preinstalled operating system instances 110. Each preinstalled operating system instance 110 may be of a different operating system as compared to an operating system of each other operating system instance 110. For example, one operating system instance 110 may be of the LINUX® operating system, where LINUX® is a trademark of Linus Torvalds, and another operating system instance may be the UNIX® operating system, which is a trademark of The Open Group, of Cambridge, Mass.

Additionally or alternatively, each preinstalled operating system instance 110 may be a different version of an operating system as compared to the version of the operating system of each other operating system instance 110. For example, one operating system instance 110 may be the XP version of the Microsoft® Windows® operating system, where Microsoft® and Windows® are trademarks of Microsoft Corp., of Redmond, Wash. By comparison, another operating system instance may be the Vista version of the Microsoft® Windows® operating system.

Additionally or alternatively still, each preinstalled operating system instance 110 may be a different technology level or service pack of an a version of an operating system as compared to the technology level or service pack of the version of the operating of each other operating system instance 110. For example, one operating system instance 110 may be technology level 4 of version 5.3 of the AIX® operating system, where AIX® is a trademark of International Business Machines Corp., of Armonk, N.Y., whereas another operating system instance 110 may be technology level 3 of version 5.3 of the AIX® operating system. As another example, one operating system instance 110 may be service pack 2 of the XP version of the Microsoft® Windows® operating system, whereas another operating system instance 110 may be service pack 3 of the XP version of the Microsoft® Windows® operating system.

The computing device 100 includes a number of logical partitions 112 that are each independently executed on the device 100 using the hardware 102. Such independent execution means that each logical partition 112 is separately executed using the hardware 102, and does not depend on any other logical partition 112 that may be run or that may be running on the computing device 100. In one embodiment, the logical partitions 112 may be AIX®, LINUX®, or UNIX® partitions that are known as LPARs. In another embodiment, the logical partitions 112 may be AIX® partitions that are known as workload partitions (WPARs). In particular, a given LPAR may be partitioned into more than one WPAR.

The logical partitions 112 are said to be supported by the hardware 102. The logical partitions 112 may share one or more resources of the hardware 102, such as the memory 104, the processors 106, and the fixed storage devices 108. For example, each logical partition 112 may run on any of the processors 106, such that the processor 106 that is running a given logical partition 112 may dynamically change. Alternatively, one or more resources of the hardware 102, again such as the memory 104, the processors 106, and the fixed storage devices 108, may be divided for exclusive use by each logical partition 112. For example, the fixed storage devices 108 may be divided into logical storage volumes, where each logical storage volume is exclusively used by a corresponding logical partition 112.

Each logical partition 112 is assigned, or mapped to, one of the different preinstalled operating system instances 110, which serves as the operating system instance for the logical partition in question. In one embodiment, each different preinstalled operating system instance 110 has mapped thereto at most just one logical partition 112. In another embodiment, two or more logical partitions 112 can be mapped to the same preinstalled operating system instance 110.

The preinstalled operating system instances 110 are preinstalled in the sense they have previously been deployed or installed on one of the removable storage devices 101, within the computing device 100 or more typically within a computing device having the same, comparable, or equivalent hardware as the computing device 100. Therefore, a logical partition 112 is mapped to a preinstalled operating system instance 110, and the logical partition 112 booted. This results in the logical partition 112 immediately using the preinstalled operating system instance 110 in question without having ever to actually install this operating system instance 110 on the logical partition 112, as if instance 110 were previously installed on the partition 112.

For example, a supplier may preinstall the operating system instance 110 to a removable storage device 101 within a computing device having the same hardware 102 as the computing device 100, and then deliver the removable storage device 101 in question to the customer at which the computing device 100 is located. The customer then just has to insert this removable storage device 101 into the computing device 100, and map a logical partition 112 to the preinstalled operating system instance 110 in question. The logical partition 112 can then immediately use this operating system instance 110, without it having to be installed on the partition 112.

Preinstallation in this respect thus means that an operating system instance 110 is ready to be run on a logical partition 112, using the hardware 102, without having to install the operating system instance 110 on the logical partition 112. For instance, some operating systems are delivered on optical discs. An optical disc is inserted into a computing device, and an installer program run off the optical disc to install an operating system onto the computing device. This process is unnecessary in relation to the preinstalled operating system instances 110 stored on the removable storage devices 101. A given logical partition 112 just has to be mapped to a desired preinstalled operating system instance 110, and then booted. The given logical partition 112 then runs the preinstalled operating system instance 110 in question as if the operating system instance 110 had been previously installed on the given logical partition 112, which it has not been.

The computing device 100 further includes a management component 114. The management component 114 may be software that is run on the hardware 102, or it may be hardware apart from the hardware 102, or it may be a combination of software and hardware. The management component 114 may be a host management controller (HMC), a baseboard management controller (BMC), a system management controller (SMC), a hypervisor, and/or another type of management component.

In the context of the embodiment of FIG. 1, the management component 114 performs two functions. First, the management component 114 permits a user to map each logical partition 112 to one of the different preinstalled operating system instances 110 stored on the removable storage devices 101. That is, the management component 114 maintains a mapping for each logical partition 112 to a location on one of the removable storage devices 101 where the different preinstalled operating system instance 110 to be used by the logical partition 112 is stored.

Second, the management component 114 prevents a removable storage device that stores one or more preinstalled operating system instances 110 currently being used by one or more logical partitions 112 from being removed from the computing device 100. Because an operating system instance 110 when being used by a logical partition 112 is used from the removable storage device 101 on which the instance 110 is stored, removal of this removable storage device 101 would cause the logical partition 112 in question to fail. Therefore, the management component 114 may prevent the removable storage device 101 from being removed from the computing device 100, to ensure the proper execution of the logical partitions 112 that use one or more operating system instances 110 stored on this removable storage device 101.

Figure 2:
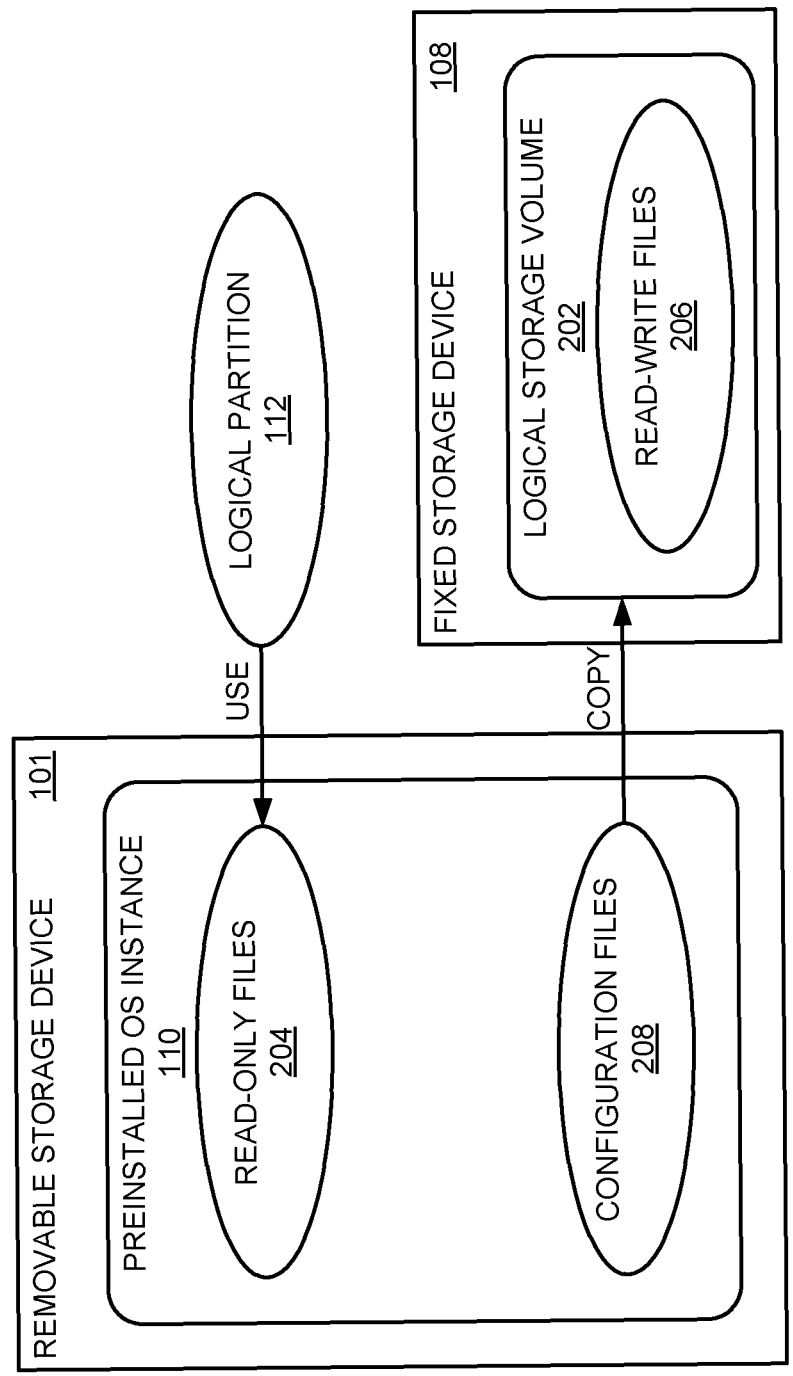
FIG. 2 is a diagram depicting how a logical partition uses a preinstalled operating system instance stored on a removable storage device, according to an embodiment of the present invention.

FIG. 2 shows in detail how a logical partition 112 uses a preinstalled operating system instance 110 stored on a removable storage device 101, according to an embodiment of the invention. The fixed storage device 108 includes a logical storage volume 202 corresponding to the logical partition 112. The logical partition 112 exclusively uses the logical storage volume 202; that is, no other logical partition 112 uses this logical storage volume 202.

The preinstalled operating system instance 110 includes two broad types of files: read-only files 204 and configuration files 208. A third type of files of or for the preinstalled operating system instance 110, read-write files 206, are generated by the logical partition 112 while actually running or using the preinstalled operating system instance 110. In general, the read-only files 204 are executed by the logical partition 112 from the removable storage device 101, and are not copied to the logical storage volume 202 for the logical partition 112. The configuration files 208, by comparison, may be copied from the removable storage device 101 to the logical storage volume 202, where they may be particularly modified to pertain to the logical partition 112. After copying, the configuration files 208 are used by the logical partition 112 from the logical storage volume 202, and are not recopied from the removable storage device 101. The read-write files are generated by the logical partition 112 when using the preinstalled operating system instance 110, and are immediately stored at and used from the logical storage volume 202, without ever being stored on the removable storage device 101.

The read-only files 204 typically account for the vast majority of the operating system instance 110, and include the libraries of code and other files that are needed to actually run the operating system instance 110. It is noted that the read-only files 204 are post-installation files of the operating system instance 110. For instance, when an operating system is installed, a number of libraries and other files are typically extracted from cabinets or other types of files as appropriate for the hardware on which the operating system is to be executed. In this case, the read-only files 204 include the libraries and other files that are extracted from the cabinets or other types of files, and may not include the cabinets or other types of files from which these files have been extracted.

The read-write files 206 may include temporary and other files, which are written to and read from periodically during execution of the operating system instance 110, such as by the logical partition 112. For example, a page file to temporarily store the contents of memory on a non-volatile storage disk is one type of read-write file. The configuration files 208 are files to configure a particular logical partition, such as the logical partition 112, to use the preinstalled operating system instance 110. For example, the preinstalled operating system instance 110 may have been installed in relation to a computing device that has eight gigabytes of memory, whereas the logical partition 112 may be assigned just two gigabytes of the memory 104 of the computing device 100. In this case, the configuration files 208 may specify this amount of memory. The read-write files 206 and the configuration files 208 may thus be considered local files for the operating system instance 110, whereas the read-only files 204 may be considered global files for the operating system instance 110.

After the logical partition 112 has been mapped to the preinstalled operating system 110, the first time the logical partition 112 is booted the following process may occur. The configuration files 208 are copied to the logical storage volume 202 corresponding to the logical partition 112. A configuration process may then be performed to adjust the configuration files 208 as appropriate to, for instance, reflect the actual hardware 102 that supports the logical partition 112. This configuration process occurs without actually installing the preinstalled operating system instance 110 on the logical partition 112.

Thereafter, the logical partition 112 can begin running the preinstalled operating system instance 110. The read-only files 204 are executed (i.e., used) by the logical partition 112 from the removable storage device 101, and are never copied to the logical storage volume 202. By comparison, the read-write files 206 and the configuration files 208 may be executed from the logical storage volume 202 itself (i.e., as stored on the logical storage volume 202). During execution of the read-only files 204, the read-write files 206 may be created at and used from the logical storage volume 202.

Copying the configuration files 208 to the logical storage volume 202 where the files 208 are then modified is desirable for two reasons. First, this ensures that the configuration process may not have to be performed each time the logical partition 112 is booted when using the preinstalled operating system instance 110. Second, this permits multiple logical partitions 112 to use the same preinstalled operating system instance 110, since each such logical partition 112 maintains its own set of read-write files 206 and configuration files 208 in its corresponding logical storage volume 202.

By using the preinstalled operating system instance 110, the logical partition 112 does not ever have to have the operating system instance 110 completely installed thereto. Some types of operating systems can require tens of minutes or even hours to completely install on a storage device for use by a logical partition. Because the logical partition 112 is using the operating system instance 110 that has been preinstalled on the removal storage device 101, this installation process is avoided. The copying of the configuration files 208, the performance of the configuration process, and the subsequent generation and storage of the read-write files 206, are not considered as part of this installation process, but rather are part of a post-installation process, and typically take significantly less time than the actual installation of the operating system instance 110.

Therefore, when a new operating system instance 110 is to be used on one or more given logical partitions 112, the new operating system instance 110 is preinstalled on a removable storage device 101. The logical partitions 112 are then mapped to and use this new operating system instance 110. Particularly, the logical partitions 112 are mapped to the location on the removable storage device 101 at which the new operating system instance 110 is stored. In this way, the new operating system instance 110 is not installed on any of the given logical partitions 112 in question.

Similarly, when a prior operating system instance 110 that was previously used on a given logical partition 112 is desired to again be used on this partition 112, after the partition 112 has already used a different operating system instance 110, the logical partition 112 just has to be shut down, and mapped back to the prior operating system instance 110. Particularly, the logical partition 112 is mapped to the location on the removable storage device 101 at which the prior operating system instance 110 is stored. When the logical partition 112 is booted again, the partition 112 will begin using the prior operating system instance 110 again. This process permits easy-to-achieve "rollbacks," for instance, from the most recent version, service pack, or technology level of an operating system, to an older version, service pack, or technology level of the operating system.

Figure 3:
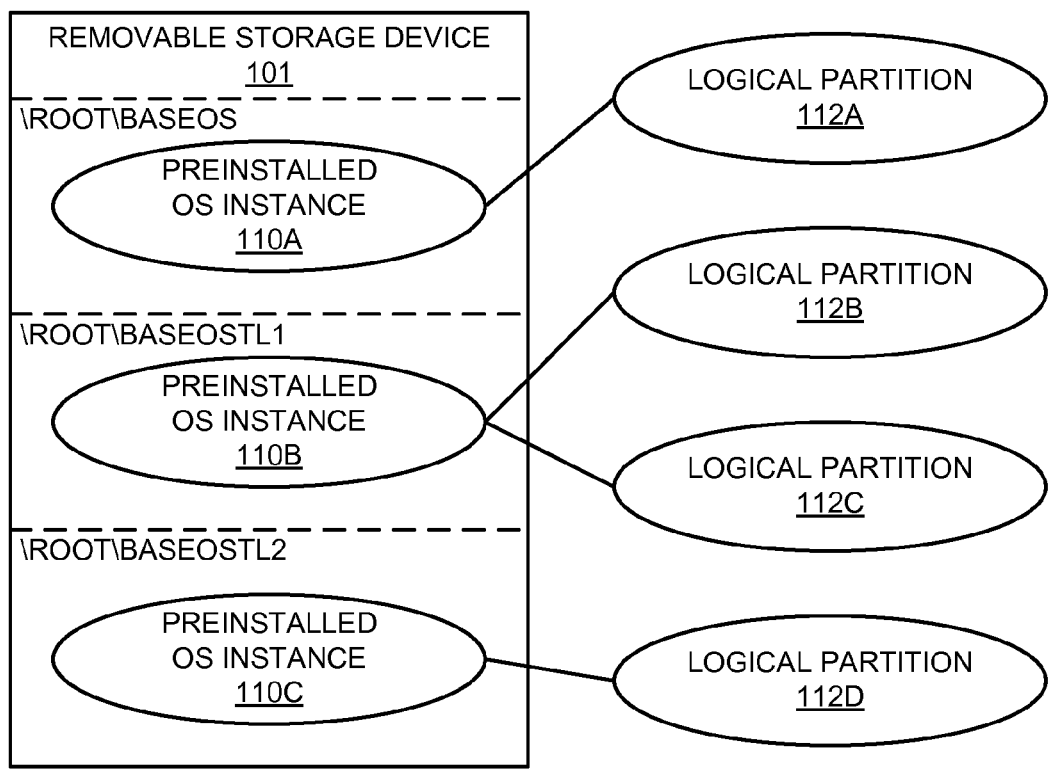
FIG. 3 is a diagram depicting how preinstalled operating system instances can be stored on removable storage devices, and how multiple logical partitions can be mapped to the same instance, according to an embodiment of the present invention.

FIG. 3 shows how preinstalled operating system instances 110 can be stored on a removable storage device 101, and how multiple logical partitions 112 can be mapped to the same operating system instance 110, according to an embodiment of the invention. The removable storage device 101 stores three preinstalled operating system instances 110A, 110B, and 110C in the example of FIG. 3. There are four logical partitions 112A, 112B, 112C, and 112D in the example of FIG. 3.

The preinstalled operating system instance 110A is stored in the directory "\root\baseos" on the removable storage device 101, and may be version 5.3 of the AIX® operating system, for instance. The preinstalled operating system instance 110B is stored in the directory "\root\baseostl1" on the removable storage device 101, and may be technology level 1 of version 5.3 of the AIX® operating system. The preinstalled operating system instance 110C is stored in the directory "\root\baseostl2" on the removable storage device 101, and may be technology level 2 of version 5.3 of the AIX® operating system. Thus, different operating system instances 110 are stored in different directories on the removable storage device 101.

The logical partition 112A is mapped to the preinstalled operating system instance 110A, and thus uses version 5.3 of the AIX® operating system as stored in the directory "\root\baseos" on the removable storage device 101. Both the logical partitions 112B and 112C are each mapped to the preinstalled operating system instance 110B, and each uses technology level 1 of version 5.3 of the AIX® operating system as stored in the directory "\root\baseostl1" on the removable storage device 101. The logical partition 112D is mapped to the preinstalled operating system 110C, and uses technology level 2 of version 5.3 of the AIX® operating system as stored in the directory "\root\baseostl2" on the removable storage device 101.

Both the logical partitions 112B and 112C can each be mapped to the preinstalled operating system instance 110B in the manner described in relation to FIG. 2. That is, the configuration files 208 of the preinstalled operating system instance 110B are copied to the logical storage volume corresponding to the logical partition 112B, and to the logical storage volume corresponding to the logical partition 112C. Similarly, the read-write files of the preinstalled operating system instance 110B are generated for immediate storage at the logical storage volume corresponding to the logical partition 112B, as well as at the logical storage volume corresponding to the logical partition 112C. However, both the logical partitions 112B and 112C use the read-only files 204 of the preinstalled operating system instance 110B as stored in the directory "\root\baseostl1" on the removable storage device 101.

FIG. 4 shows a method 400, according to an embodiment of the invention. One or more removable storage devices 101 are inserted into a computing device 100 (402). The management component 114 of the computing device 100 may thereafter scan the removable storage devices 101 to locate the preinstalled operating system instances 110 stored on the storage devices 101 (404). For each logical partition 112 of the computing device 100, the following can then be performed.

A logical partition 112 is mapped to a desired preinstalled operating system instance 110 stored on the removable storage devices 101 (406). For instance, the management component 114 may permit a user to map a logical partition 112 to a preinstalled operating system instance 110 stored on the removable devices 101, by showing all the operating system instances 110 stored on the removable storage devices 101 to the user, and having the user select a desired instance 110 within a user interface, such as a graphical user interface. A logical partition 112 is then booted for the first time with (i.e., using) the preinstalled operating system instance 110 to which the partition 112 has been mapped (408).

When a logical partition 112 is booted for the first time with a preinstalled operating system instance 110, the following may be performed. The configuration files 208 of the preinstalled operating system instance 110 are copied to the logical storage volume 202 to which the logical partition 112 exclusively corresponds (410). In this respect, it is noted that the read-write files 206 will be generated and stored at the logical storage volume 202 when the preinstalled operating system instance 210 is actually used, whereas the read-only files 204 will be not be copied from the removable storage device 101 and instead will be executed from the storage device 101. The logical partition 112 may be configured to use the preinstalled operating system instance 110 in question (412), when the logical partition 112 is booted for the first time with this operating system instance 110, such that the configuration files 208 that have been copied to the logical storage volume 202 are modified.

At some point, it may be desired to change the preinstalled operating system instance 110 being used by a logical partition 112. To achieve this, execution of the logical partition 112 is stopped, and the method 400 is repeated at part 406 with respect to this logical partition (414). That is, a new (i.e., different) preinstalled operating system instance 110 is selected in part 406, and the logical partition 112 is booted for the first time with this new operating system instance 110 in part 408. Furthermore, local files of the new preinstalled operating system instance 110 may be copied to the local volume 202 for the logical partition 112 in part 410, and the logical partition 112 may be configured to use the new operating system instance 110 in part 412.

The method 400 thus describes a process by which a preinstalled operating system instance 110 is mapped to a logical partition 112 for use by the logical partition 112, without the operating system instance 110 in question ever having to be actually installed on the partition 112. For instance, configuring the logical partition 112 to use the preinstalled operating system instance 110 in part 412 is performed without actually installing the given preinstalled operating system instance 110 on the logical partition 112. For example, the read-only files 204 of the operating system instance 110 are not copied to the logical storage volume 202 for the logical partition 112, but rather are used by the logical partition 112 directly from the removable storage device 101 in question.

As can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. A computing device comprising:
    one or more removable storage devices to store a plurality of different preinstalled operating system instances; and,
    hardware to support a plurality of logical partitions, each logical partition to be independently executed on the computing device, each logical partition is mapped to and uses one of the different preinstalled operating system instances,
    such that a given preinstalled operating system instance to which a given logical partition is mapped is used by the given logical partition without ever having to be installed on the given logical partition,
    wherein each different preinstalled operating system instance is one of:
        a different operating system as compared to an operating system of each other different preinstalled operating system instance;
        a different version of the operating system as compared to a version of the operating system of each other different preinstalled operating system instance;
        a different technology level of the version of the operating system as compared to a technology level of the version of the operating system of each other different preinstalled operating system instance; and,
        a different service pack of the version of the operating system as compared to a service pack of the version of the operating system of each other different preinstalled operating system instance.

2. The computing device of claim 1, wherein to use a new operating system instance on the given logical partition, the new operating system instance is preinstalled on one of the removable storage devices and thereafter the given logical partition is mapped to and uses the new operating system instance, such that the new operating system instance does not have to be installed on the given logical partition.

3. The computing device of claim 1, further comprising a management component to maintain a mapping for each logical partition to a location on one of the removable storage devices where the different preinstalled operating system instance to be used by the logical partition is stored.

4. The computing device of claim 3, wherein after the given logical partition has begun using a new operating system instance, to use a prior operating system instance previously used on the given logical partition, the mapping for the given logical partition is changed to a location on one of the removable storage devices where the prior operating system instance is stored.

5. The computing device of claim 1, wherein the hardware comprises a fixed storage device having logical storage volumes corresponding to the logical partitions, each logical partition exclusively using one of the logical storage volumes,
    wherein for a particular preinstalled operating system instance stored on a particular removable storage device, the read-only files of the particular preinstalled operating system instance are stored on the particular removable storage device,
    and wherein for a particular logical partition that uses the particular preinstalled operating system instance, configuration files, and read-write files pertaining to the particular preinstalled operating system are stored on the logical storage volume corresponding to the particular logical partition,
        such that during first-time execution of the particular preinstalled operating system instance on the particular logical partition, the particular preinstalled operating system instance is configured for the particular logical partition without actually installing the particular preinstalled operating system instance on the particular logical partition,
        and such that the read-only files of the particular preinstalled operating system instance are used by the particular logical partition from the particular removable storage device.

6. The computing device of claim 5, wherein during the first-time execution of the particular preinstalled operating system instance on the particular logical partition, the configuration files pertaining to the particular preinstalled operating system are copied from the removable storage device storing the particular preinstalled operating system instance to the logical storage volume corresponding to the particular logical partition.

7. The computing device of claim 1, wherein a particular preinstalled operating system instance stored on a particular removable storage device is used by two or more logical partitions.

8. The computing device of claim 1, wherein each removable storage device stores a plurality of different versions, technology levels, and/or service packs of a same operating system in a different directory, and wherein each different version, technology level, and/or service pack of the same preinstalled operating system corresponds to one of the different preinstalled operating system instances.

9. The computing device of claim 1, further comprising a management component to prevent a particular removable storage device from being removed from the computing device where at least one logical partition is currently using one of the different preinstalled operating system instances stored on the particular removable storage device.

10. The computing device of claim 1, wherein at least one of the logical partitions is a workload partition.

11. The computing device of claim 1, wherein the removable storage devices are flash memory cards.

12. A method comprising:
inserting one or more removable storage devices into a computing device, the removable storage devices storing a plurality of different preinstalled operating system instances, the computing device having a plurality of logical partitions, each logical partition independently executed on the computing device; and,
mapping each logical partition to one of the different preinstalled operating system instances, such that a given preinstalled operating system instance to which a given logical partition is mapped is used by the given logical partition without ever having to be installed on the given logical partition,
wherein each different preinstalled operating system instance is one of:
a different operating system as compared to an operating system of each other different preinstalled operating system instance;
a different version of the operating system as compared to a version of the operating system of each other different preinstalled operating system instance;
a different technology level of the version of the operating system as compared to a technology level of the version of the operating system of each other different preinstalled operating system instance; and,
a different service pack of the version of the operating system as compared to a service pack of the version of the operating system of each other different preinstalled operating system instance.

13. The method of claim 12, further comprising:
booting the given logical partition for a first time with the given preinstalled operating system instance; and,
configuring the given logical partition to use the given preinstalled operating system instance without actually installing the given preinstalled operating system instance on the given logical partition.

14. The method of claim 13, further comprising:
copying configuration files pertaining to the given preinstalled operating system to a logical storage volume of a fixed storage device of the computing device corresponding to the given logical partition,
wherein read-only files of the given preinstalled operating system instance remain stored on a given removable storage device storing the given preinstalled operating system instance, are not copied to the logical storage volume, and are used by the given logical partition from the given removable storage device,
and wherein read-write files for the given preinstalled operating system instance are created on the logical storage volume without ever being stored on the given removable storage device.

15. The method of claim 13, further comprising changing the given preinstalled operating system instance used by the given logical partition from a first preinstalled operating system instance to a second preinstalled operating system instance by:
stopping execution of the given logical partition;
remapping the given logical partition from the first preinstalled operating system instance to the second preinstalled operating system instance;
booting the given logical partition for a first time with the second preinstalled operating system instance; and,
configuring the given logical partition to use the second given preinstalled operating system instance without actually installing the second given preinstalled operating system instance on the given logical partition.

16. The method of claim 12, wherein a particular preinstalled operating system instance stored on a particular removable storage device is used by two or more logical partitions.

17. The method of claim 12, wherein each removable storage device stores a plurality of different versions, technology levels, and/or service packs of a same operating system in a different directory,
and wherein each different version, technology level, and/or service pack of the same preinstalled operating system corresponds to one of the different preinstalled operating system instances.

18. A computer program product comprising a computer-readable data storage medium storing one or more computer programs that when executed by a computing device cause a method to be performed, the method comprising:
scanning one or more removable storage devices inserted into the computing device to locate a plurality of different preinstalled operating system instances stored on the removable storage device, the computing device having a plurality of logical partitions, each logical partition independently executed on the computing device; and,
permitting a user to map each logical partition to one of the different preinstalled operating system instances, such a given preinstalled operating system instance to which a given logical partition is mapped is used by the given logical partition without ever having to be installed on the given logical partition,
wherein each different preinstalled operating system instance is one of:
a different operating system as compared to an operating system of each other different preinstalled operating system instance;
a different version of the operating system as compared to a version of the operating system of each other different preinstalled operating system instance;
a different technology level of the version of the operating system as compared to a technology level of the version of the operating system of each other different preinstalled operating system instance; and,
a different service pack of the version of the operating system as compared to a service pack of the version of the operating system of each other different preinstalled operating system instance.

* * * * *